United States Patent Office 3,349,132
Patented Oct. 24, 1967

3,349,132
PREPARATION OF NINHYDRIN
Bernard Pierre Brossard and Jacques Francis Paul Boichard, Lyon, France, assignors to Rhone-Poulenc S.A., Paris, France, a French body corporate
No Drawing. Filed Nov. 19, 1963, Ser. No. 324,830
Claims priority, application France, Nov. 29, 1962, 917,040
5 Claims. (Cl. 260—590)

The present invention relates to the preparation of ninhydrin.

Ninhydrin is the hydrated form of indane-1,2,3-trione, and has the formula:

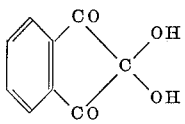

It is employed in chemical analysis for the detection of aminoacids.

It has already been proposed to prepare ninhydrin from indane-1,3-dione by nitration, halogenation and decomposition of the nitrohalogenated derivative [G. Vanags and A. Lode, Ber. 71 B, 1267–1272 (1938)]. The yield on the indanedion, when the bromo derivatives are used, may reach 40%, but the process must be carried out in three stages.

The process most commonly employed at present consists in oxidising indane-1,3-dione with selenium dioxide by the method of W. O. Teeters and R. L. Shriner, J. Amer. Chem. Soc., 55, 3026–3029 (1933). Ninhydrin is thus obtained in a single stage and in a yield of 31–35% based on the indane-1,3-dione. However, the ninhydrin obtained has a brown-red coloration and a strong odor and contains traces of selenium [P. B. Hamilton and P. J. Ortiz, Anal. Chem. 22, 948–949 (1955)].

Indane-1,3-dione may be prepared by simultaneous hydrolysis and decarboxylation of the product obtained by condensation of ethyl phthalate with ethyl acetate in the presence of sodium.

According to the present invention, ninhydrin is prepared by single-stage process from 2-acyl-indane-1,3-diones of the general formula:

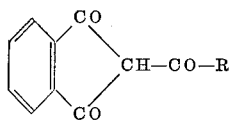

in which R represents an organic residue, e.g. an optionally substituted hydrocarbon or heterocyclic radical by oxidation at above 70° C. with 1.33 to 10 moles (per mole of acyl-indane-dione) of nitric acid of 10 to 50% concentration (based on the total weight of nitric acid, water, and any other inert diluent present).

The 2-acyl-indane-1,3-diones used are already known, and can be prepared, by the method of L. B. Kilgore, J. H. Ford and W. C. Wolfe, Ind. Eng. Chem., 34, 494–497 (1942), by condensation of a methylketone of formula R—CO—CH$_3$ with ethyl phthalate in the presence of sodium or of a sodium alkoxide. In the above formula R is ordinarily an alkyl radical, preferably of 4 or 5 carbon atoms, an aryl (including heterocyclic aryl) radical, or an aralkyl radical. For example, the acyl-indane-dione employed may be that in which R is isoamyl, phenyl, 2-thienyl, β-naphthyl, diphenylmethyl, 3-pyridyl, or t-butyl.

Any inert diluent employed must be at least partially miscible with aqueous nitric acid and must at least partially dissolve the acyl-indane-dione. Besides water, there may be mentioned, for example, acetic acid, nitroethane, acetonitrile and propionitrile.

When the oxidation is carried out in the absence of an inert organic diluent, the aqueous nitric acid employed has a concentration of 10% to 50% (by weight of HNO$_3$ in 100 grams of aqueous solution), and preferably of 15–30%. When the oxidation is carried out in the presence of an inert organic diluent, it is arranged that the quantity of nitric acid shall be 10–50%, again preferably 15–30%, by weight of the mixture of nitric acid, water (if any) and inert organic diluent. With concentrations outside these limits, a substantially lower yield of ninhydrin is obtained. The quantity of nitric acid employed is preferably between 2.66 and 8.5 moles.

The oxidation of the acyl-indane-diones begins at about 70° C., but it is simpler and quicker to operate at the boiling temperature of the oxidation mixture. When the reaction has ended, the mixture is cooled and the ninhydrin is isolated, for example by concentration. The product thus obtained is generally white and odorless and analyses about 80% of ninhydrin. When a product of higher titre is desired, it is best to wash the product obtained with an appropriate organic solvent or to recrystallize it. Diisopropyl ether is, for example, very suitable for such an operation.

The oxidation of the invention is apparently specific for 2-acylindane-1,3-diones, because if indane-1,3-dione itself is oxidized with nitric acid, phthalonic acid, or other degradation products different from ninhydrin, are obtained by a reaction which is difficult to control and difficult to reproduce.

The following examples illustrate the invention.

EXAMPLE 1

Into a three-necked 250 cc. spherical flask provided with a stirrer and a condenser are introduced 75 cc. of 30% nitric acid and 12.5 g. of 2-benzoyl-indane-1,3-dione, and the heterogeneous mixture is then stirred and heated in an oil bath. The reaction starts at 95° C. and the temperature of the flask rapidly rises to 102° C. The mixture refluxes and nitrous vapors are evolved. At the end of 5 minutes, the whole product is dissolved. The heating is stopped, the mixture is cooled, the benzoic acid (5.54 g.) is filtered off, and the filtrate is concentrated in vacuo at a temperature not exceeding 35° C. until its volume is 25 cc. The precipitation is completed by cooling to 2° C. There are thus obtained 4.38 g. of product melting at 240° C., which is colorless and odorless and which analyses 80% of ninhydrin. The yield is thus 39.5%, based on the 2-benzoyl-indane-1,3-dione employed.

EXAMPLE 2

The same apparatus is employed as in Example 1 and 92.5 cc. of 25% nitric acid and 11.5 g. of 2-isovaleryl-indane-1,3-dione are charged. The reaction starts at 93°–94° C. and the 2-isovaleryl-indane-1,3-dione disappears after heating under reflux (100° C.) for 18 minutes. The clear solution obtained is cooled and concentrated by evaporation in vacuo below 35° C. to a volume of 24 cc. After cooling to 2° C., a precipitate weighing 5.55 g. is isolated, which after washing with 50 cc. of diethyl ether gives 3.88 g. of 80% ninhydrin, corresponding to a yield of 34.6%, based on the 2-isovaleryl-indane-1,3-dione employed.

EXAMPLE 3

Into a three-necked 50 cc. spherical flask provided with a stirrer, a condenser and a dropping funnel are introduced 2.50 g. of 2-benzoyl-indane-1,3-dione and 15.5 cc. of acetonitrile, and the mixture is stirred and heated to boiling point. To this boiling solution is then added a solution, preheated at about 50° C., of 6 cc. of nitric acid ($d$=1.38) in 2 cc. of water, and the heating is then continued under reflux (82° C.) for 5 minutes, nitrous vapors being evolved.

The reaction mixture is cooled and taken up in 100 cc. of diethyl ether and the resulting homogeneous phase is dried over sodium sulphate. After filtration, the sodium sulphate is washed with diethyl ether and the filtrate is evaporated, first on the water bath, and then at normal temperature under a light current of air. There is thus obtained a white pasty residue which is taken up in 10 cc. of diisopropyl ether. The whole matter dissolves, and white crystals then gradually separate. The product is filtered off, washed with a little diisopropyl ether, and dried to constant weight in vacuo. There is thus obtained 0.732 g. of ninhydrin melting at 245° C. and having a concentration of 94%. The ninhydrin yield is thus 38.6%, based on the 2-benzoyl-indane-1,3-dione employed.

EXAMPLE 4

Into a three-necked 50 cc. spherical flask provided with a stirrer, a condenser and a dropping funnel are introduced 3 g. of 2-(2-naphthyl)-indane-1,3-dione and 18.5 cc. of acetonitrile, and the mixture is stirred and heated to boiling point. To this boiling solution is then added a solution, preheated to about 50° C., of 6 cc. of nitric acid ($d$=1.38) in 6.5 cc. of water. Heating is then continued under reflux (80° C.) for 10 minutes, nitrous vapors being evolved.

The reaction mixture is cooled and taken up in 100 cc. of diethyl ether, and the resulting homogeneous phase is dried over sodium sulphate. After filtration, the sodium sulphate is washed with diethyl ether and the filtrate is evaporated, first on the water bath, and then at normal temperature in a current of air. There is thus obtained a white pasty residue which is taken up in 10 cc. of diisopropylether. The whole matter dissolves, and white crystals then gradually separate. The product is filtered, washed with a little diisopropyl ether and dried to constant weight. There is thus obtained 0.789 g. of a product which, although melting at 245° C., analyses only 82.5% of ninhydrin.

This product is taken up in 15 cc. of water, warmed to 45° C., and cooled, and the insoluble matter is filtered off and washed with 5 cc. of water. The aqueous filtrate, after evaporation to dryness, gives a white crystalline solid which, when dried to constant weight, weighs 0.635 g., melts at 245° C. and analyses 96.8% of ninhydrin. The ninhydrin yield is thus 35.7%, based on the 2-(2-naphthyl)-indane-1,3-dione employed.

We claim:

1. Process for the production of ninhydrin which comprises oxidising a 2-acyl-indane-1,3-dione of the formula:

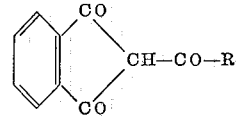

where R is alkyl, aryl or aralkyl, at from 70° C. to the reflux temperature of the mixture with 1.33 to 10 moles, per mole of acyl-indane-dione, of nitric acid of 10 to 50% concentration, based on the total weight of nitric acid, water and any other inert diluent present.

2. Process according to claim 1 in which R is a member selected from the class consisting of alkyl radicals of 4 and 5 carbon atoms, phenyl, and 2 naphthyl.

3. Process according to claim 1 in which the oxidation is carried out at the reflux temperature of the mixture.

4. Process according to claim 1 in which the oxidation is carried out using 2.66 to 8.5 moles of nitric acid per mole of acyl-indane-dione.

5. Process according to claim 1 in which the concentration of nitric acid is 15 to 30%.

References Cited

Teeters et al.: J. Am. Chem. Soc., 55, pp. 3026–3028 (1933).

LEON ZITVER, *Primary Examiner.*

DANIEL D. HORWITZ, *Examiner.*